(12) United States Patent
Lancaster

(10) Patent No.: US 10,503,408 B2
(45) Date of Patent: Dec. 10, 2019

(54) DEPLOYMENT OF AN UPGRADE TO A STORAGE SYSTEM BASED ON CORRELATION ANALYSIS OF MEASUREMENTS OF THE STORAGE SYSTEM

(71) Applicant: HEWLETT PACKARD ENTERPRISE DEVELOPMENT LP, Houston, TX (US)

(72) Inventor: Larry Lancaster, Alameda, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 688 days.

(21) Appl. No.: 14/455,837

(22) Filed: Aug. 8, 2014

(65) Prior Publication Data

US 2014/0351361 A1 Nov. 27, 2014

Related U.S. Application Data

(63) Continuation of application No. 13/901,197, filed on May 23, 2013, now Pat. No. 8,832,330.

(51) Int. Cl.
*G06F 3/06* (2006.01)
*H04L 29/08* (2006.01)
(Continued)

(52) U.S. Cl.
CPC ............ *G06F 3/0611* (2013.01); *G06F 3/067* (2013.01); *G06F 3/0653* (2013.01);
(Continued)

(58) Field of Classification Search
CPC .... G06F 3/067; G06F 3/0611; G06F 11/3034; G06F 11/0653
See application file for complete search history.

(56) References Cited

U.S. PATENT DOCUMENTS

| 6,614,440 B1 | 9/2003 | Bowen et al. |
| 2002/0093917 A1 | 7/2002 | Knobbe et al. |

(Continued)

OTHER PUBLICATIONS

Extrahop Networks, "Storage Modules: Monitor SAN and NAS Storage Performance" (2013) 3 pgs.
(Continued)

*Primary Examiner* — Idriss N Alrobaye
*Assistant Examiner* — Brooke J Taylor
(74) *Attorney, Agent, or Firm* — Hewlett Packard Enterprise Patent Department

(57) ABSTRACT

Described herein are methods, systems and machine-readable media that facilitate an analysis of the contributing factors of storage system latency. The variation over time of the storage system latency is measured, along with the variation over time of the activity of various processes and/or components, the various processes and/or components being potentially contributing factors to the storage system latency. The latency measurements are correlated with the process and/or component measurements. High correlation, while not providing direct evidence of the causation of latency, is nevertheless used to identify likely factors (i.e., processes, components) contributing to latency. The latency measurements are plotted over time, the plot including supplemental information indicating, at any time instant, likely factors contributing to the storage system latency.

19 Claims, 8 Drawing Sheets

(51) Int. Cl.
*G06F 11/30* (2006.01)
*H04L 12/26* (2006.01)
*G06F 11/34* (2006.01)

(52) U.S. Cl.
CPC ...... *G06F 11/3034* (2013.01); *G06F 11/3419* (2013.01); *G06F 11/3452* (2013.01); *H04L 43/0852* (2013.01); *H04L 67/34* (2013.01)

(56) References Cited

U.S. PATENT DOCUMENTS

| | | | |
|---|---|---|---|
| 2002/0186246 A1* | 12/2002 | Burnette | G06F 17/5045 715/771 |
| 2005/0060403 A1 | 3/2005 | Bernstein et al. | |
| 2006/0072476 A1 | 4/2006 | Sirivara et al. | |
| 2008/0247327 A1 | 10/2008 | Weil et al. | |
| 2008/0320338 A1 | 12/2008 | Ward | |
| 2009/0006606 A1 | 1/2009 | Lubbers et al. | |
| 2010/0094592 A1* | 4/2010 | Cherkasova | G06F 11/3409 702/182 |
| 2012/0023221 A1 | 1/2012 | Dayan | |
| 2013/0342506 A1 | 12/2013 | Westhues et al. | |
| 2013/0343390 A1 | 12/2013 | Moriarty et al. | |

OTHER PUBLICATIONS

Fluk Networks, "Fluke Networks Optiview XG v8 Optimized to Speed Troubleshooting in Virtualized Data Centers", May 23, 2012, 2 pgs.
Fluke Networks, "Technical Brief: Automated nTier Transaction Analysis", Jan. 29, 2013, 2 pgs.
Sreegiriraju, Saradhi, "Tintri for VDI Deployments", Tintri, Inc. (2012) 10 pgs.
Traeger, Avishay, "Analyzing Root Causes of Latency Distributions", Aug. 2008, 85 pgs.
312 Amendment filed Jun. 25, 2014, from U.S. Appl. No. 13/901,197, filed May 23, 2013, 15 pgs.
Notice of Allowance dated Jun. 5, 2014, from U.S. Appl. No. 13/901,197, filed May 23, 2013, 15 pgs.
Preliminary Amendment filed Feb. 28, 2014, from U.S. Appl. No. 13/901,197, filed May 23, 2013, 9 pgs.

* cited by examiner

DEPLOYMENT OF AN UPGRADE TO A STORAGE SYSTEM BASED ON CORRELATION ANALYSIS OF MEASUREMENTS OF THE STORAGE SYSTEM

RELATED APPLICATIONS

The present application is a Continuation of U.S. patent application Ser. No. 13/901,197 filed on May 23, 2013 (now issued as U.S. Pat. No. 8,832,330), incorporated herein by reference.

FIELD OF THE INVENTION

The present invention relates to methods and systems for analyzing the latency of a storage system, and more particularly relates to methods, systems and machine-readable media that assist a user with the identification of the likely contributing factor(s) of storage system latency by correlating the activity of storage system components with latency measurements.

BACKGROUND

One important measure of performance for a storage system is latency (i.e., the time it takes for a particular request to be serviced by the storage system). Latency introduced by a storage system, if of long enough duration, may cause, for example, a user to notice a delay in the loading of a webpage (in the case of read latency) or may cause, for example, a user to wait for files to be uploaded onto a Dropbox™ account (in the case of write latency).

In general, there may be numerous factors that contribute to the latency of a storage system, including network delays, a cache miss, disk read time, etc. To effectively combat latency, factor(s) that significantly contribute to the latency may be identified. In turn, software patches may be created and/or hardware resources may be allocated to address those factors. Identifying factor(s) that significantly contribute to a storage system's latency, however, is often a time intensive and computationally expensive process.

SUMMARY OF THE INVENTION

In one embodiment, methods, systems and machine-readable media are provided to assist a user (e.g., storage system engineer) with his/her identification of the major contributing factor(s) of storage system latency. A storage system may be instrumented with sensors that measure the storage system's latency and the activity of processes and/or components of the storage system. The sensor measurements may be collected and periodically transmitted to a monitoring/analysis server where the sensor measurements are stored and analyzed.

In order to determine which one (or more) of the processes and/or components is a significant contributor to the storage system latency, the time-evolution of the respective activity of the processes and/or components is correlated with the time-evolution of the storage system latency. High correlation, while not conclusively providing evidence of one process or component contributing to the overall latency, is still helpful in identifying potential factors that significantly impact the storage system latency. Of particular interest is the correlation of one factor to the storage system latency relative to the correlation of other factors to the storage system latency. Those factors with a high correlation relative to other factors may be subject to further examination by storage system engineers.

Further, such correlation analysis may be used as a means to validate a hardware upgrade and/or software patch to the storage system. Specifically, one factor may be indicated by the correlation analysis as the bottleneck (i.e., the most significant contributing factor to the storage system latency). A hardware upgrade or software patch may be deployed to address the identified factor. Following the upgrade or patch, the correlation analysis may be repeated. If the factor previously identified as the bottleneck is less correlated with the storage system latency, it may be inferred that the upgrade or patch accomplished its intended goal.

These and other embodiments of the invention are more fully described in association with the drawings below.

BRIEF DESCRIPTION OF THE DRAWINGS

The present invention is illustrated by way of example, and not limitation, in the figures of the accompanying drawings in which.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
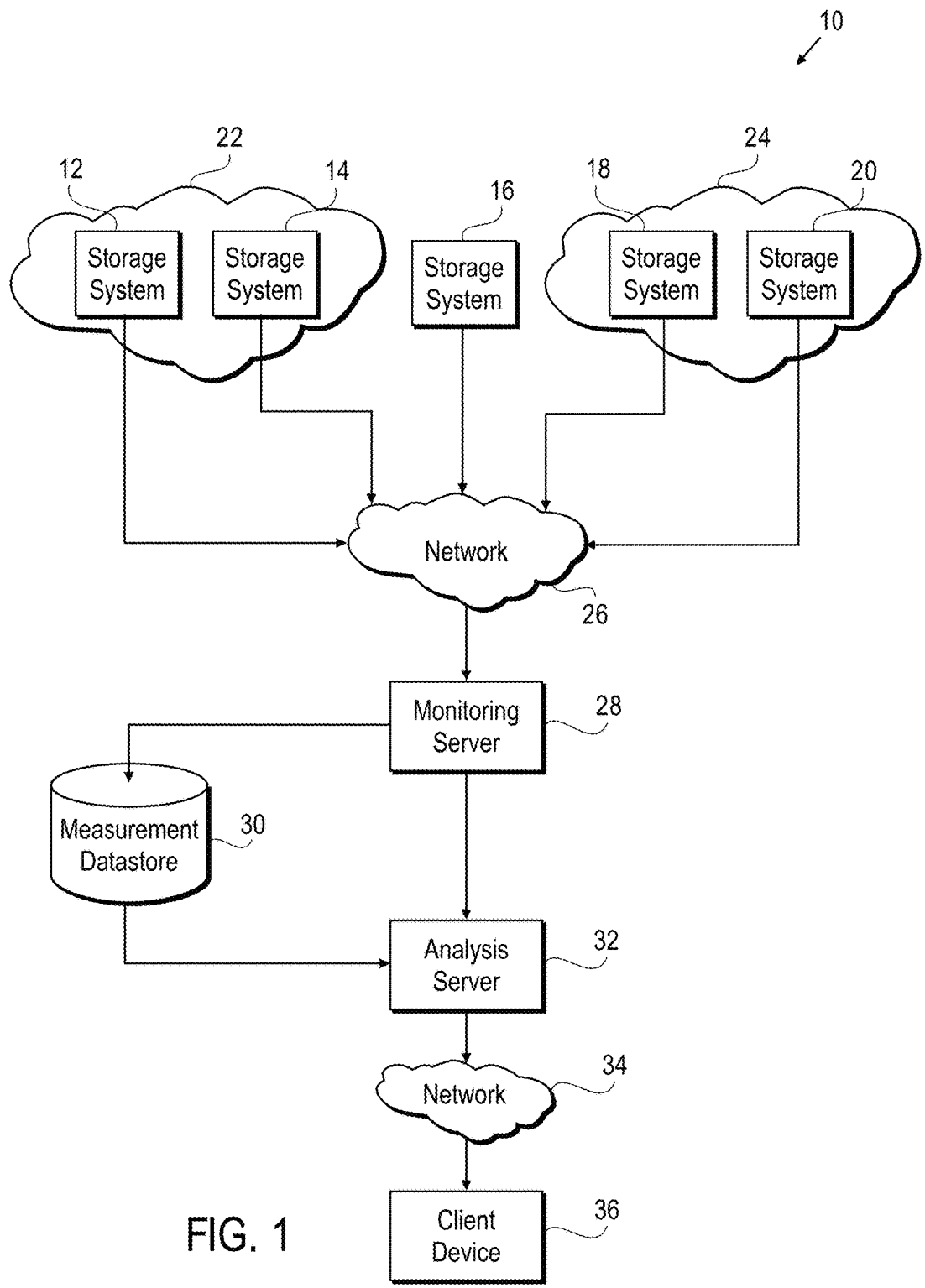
FIG. 1 depicts a system diagram in which a plurality of storage systems are configured to send sensor measurements to a monitoring/analysis server, which stores and analyzes the sensor measurements so as to facilitate a determination of the major contributing factors of a storage system's latency, according to one embodiment of the invention.

FIG. 1 depicts an environment 10 within which embodiments of the present invention may be instantiated. In environment 10, a number of storage systems (12, 14, 16, 18, 20) may be communicatively coupled with monitoring server 28 via network 26. Storage systems 12 and 14 may belong to enterprise 22; likewise, storage systems 18 and 20 may belong to enterprise 24. It is also possible for components of a single storage system to be distributed across multiple enterprises. Network 26 may be any form of communications means and, in some cases, may be individual communications links, or one or more communications networks, including private networks, public networks and/or virtual private networks over public networks.

Each storage system may be instrumented with a number of sensors which measure the respective activity associated with components and/or processes of the storage system. The activity measured may include the CPU load, disk businesses, the number of re-transmits indicating network stress, etc. The sensors may also measure the latency associated with each storage system, the latency being a measure of how long it takes a request to be serviced by a storage system. Measurements may be taken on a periodic basis (e.g., every second, every minute, every 5 minutes, etc.) such that a time series of measurements may be generated by each sensor. Measurements may be transmitted in real time from each storage system to monitoring server 28. In a preferred embodiment, measurements may be stored locally at each storage system, and periodically transmitted in batches from each storage system to monitoring server 28 (e.g., once every hour, once every day, etc.) so that measurements do not constantly flood network 26. A large quantity of measurements may be taken at each storage system. In one embodiment of the invention, approximately 30 million measurements are transmitted from each storage system to monitoring server 28 every day.

Upon receiving the sensor measurements, monitoring server 28 may store the measurements in measurement datastore 30, which subsequently provides the measurements to analysis server 32. Analysis server 32 may analyze the measurements associated with each storage system, and may attempt to determine the significant contributing factors of latency associated with each storage system. In addition and/or alternatively, the analysis server may perform an analysis that assists a storage system engineer in his/her determination of the significant contributing factors of latency associated with each storage system. While monitoring server 28 and analysis server 32 are depicted as separate components in the embodiment of FIG. 1, monitoring server 28 and analysis server 32 could, in another embodiment, be configured as a single component.

Analysis in the form of statistics, plots, charts, tables, etc. may be transmitted to client device 36 via network 34. Similar to network 26, network 34 may be any form of communications means and, in some cases, may be individual communications links, or one or more communications networks, including private networks, public networks and/or virtual private networks over public networks. The analysis may be viewed on a display device of client device 36, printed by a printer of client device 36, etc. In another embodiment, the analysis may be directly communicated to a person by the analysis server (e.g., via a display or printer of the analysis server) without the need for client devices.

Figure 2:
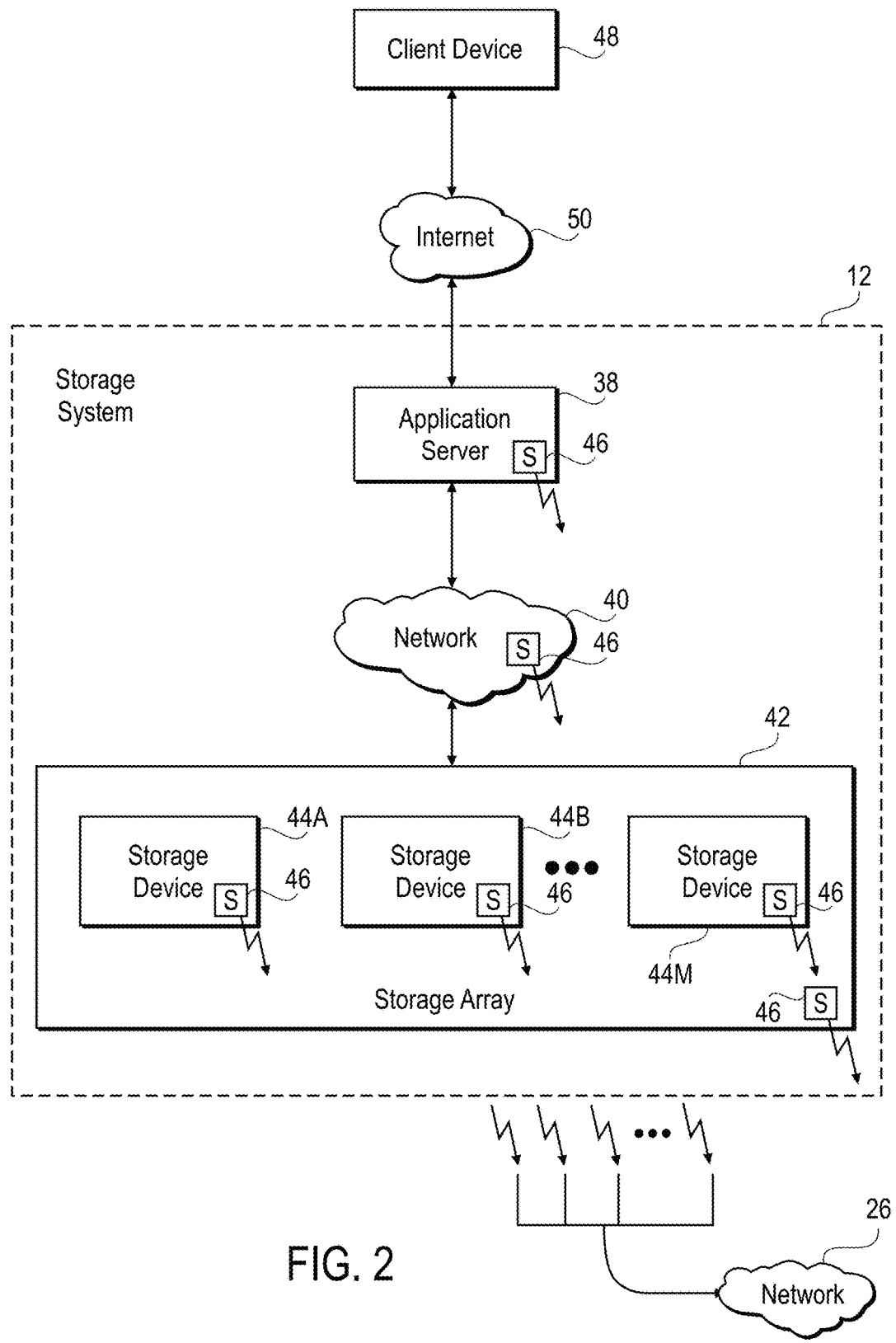
FIG. 2 depicts a storage system interfaced with a client device, according to one embodiment of the invention.

FIG. 2 depicts one embodiment of storage system 12, including an application server 38 interfaced to storage array 42 via network 40. Examples of application server 38 include a file server, an e-mail server, a database manager, and a virtual machine. Examples of a storage array include an iSCSI (Internet Small Computer System Interface) storage array, a particular iSCSI storage array being a Nimble™ storage array manufactured by Nimble Storage™ of San Jose, Calif. Similar to network 26, network 40 may be any form of communications means and, in some cases, may be individual communications links, or one or more communications networks, including private networks, public networks and/or virtual private networks over public networks. Network 40 may also include one or more routers, switches, etc. Storage array 42 may include a plurality of storage devices 44A, 44B . . . 44M, including solid-state storage devices (e.g., flash-memory based devices), disk storage devices, etc. Storage system 12 may be interfaced with one or more client devices 48 through the Internet 50 or other communication network.

As depicted in FIG. 2, the storage system may be instrumented with one or more sensors 46 (including counters) which enable the activity of various processes and/or components to be measured. For instance, a sensor may count the number of cache misses that occurs every minute. In one embodiment, sensors may only be instrumented on components of storage array 42, while in other embodiments, sensors may be instrumented on application server 38 and network 40 as well. As previously described, such sensor measurements may be temporarily stored at storage system 12, before being transmitted to monitoring server 28 via network 26.

In the context of FIG. 2, a read latency might refer to the time which elapses from application server 38 receiving a request for data, application server 38 communicating the request to storage array 42, storage array 42 reading the requested data from one or more of its storage devices 44A-44M, storage array 42 communicating the data to application server 38, to application server 38 finally responding to the request with the desired data. Write latency might refer to the time which elapses from application server 38 receiving a request to store data, application server 38 transmitting the data to storage array 42, storage array 42 writing the data to one or more storage devices 44A-44M, and to application server 38 finally receiving an acknowledgement from storage array 42 notifying the data being successfully stored.

As discussed above, one goal of the present invention is to determine the significant contributing factors to a storage system's latency (or the bottleneck of the read/write operations described above). In the context of FIG. 2, the goal might be to determine whether the bottleneck is due to one or more of application server 38, network 40, storage array 42, or a particular one of the storage devices 44A-44M. Of course, this is a simplified description. Numerous other processes/components not described herein could be significant contributing factors to latency. These could be processes/components not depicted in FIG. 2 or could be processes/components, such as CPUs, caches, etc. that are part of the components depicted in FIG. 2, which have not been described in detail. Nevertheless, a complete listing of the particular processes/components that may contribute to latency is not critical to the present invention. Rather, embodiments of the present invention are directed at techniques which, given a set of factors potentially contributing to latency, assist a person with narrowing down that set into the top one or two (or other small number of) factors which likely are the root cause(s) of storage system latency.

One way to determine the root cause(s) of storage system latency is to directly measure the contribution of each component (or process) to the overall storage system latency (e.g., contribution in terms of milliseconds or other time unit), and identify that component (or those components) which contributed most to the overall latency as the main bottleneck (or root causes). While such approach is possible and indeed is an approach utilized by some companies (e.g., Tintri™ of Mountain View, Calif.), such detailed measurements are not always available.

In contrast, one embodiment of the present invention relies upon activity measurements to infer the root cause(s) of latency. The inventor has observed from experience that factors that significantly contribute to latency are generally those components (or processes) whose activity is highly correlated with latency. While correlation, in general, does not imply causation (as it could be latency that increases the activity of a component or process), correlation can be used to narrow down the factors that potentially contribute to latency, such factors then being subject to further analysis.

Figure 3:
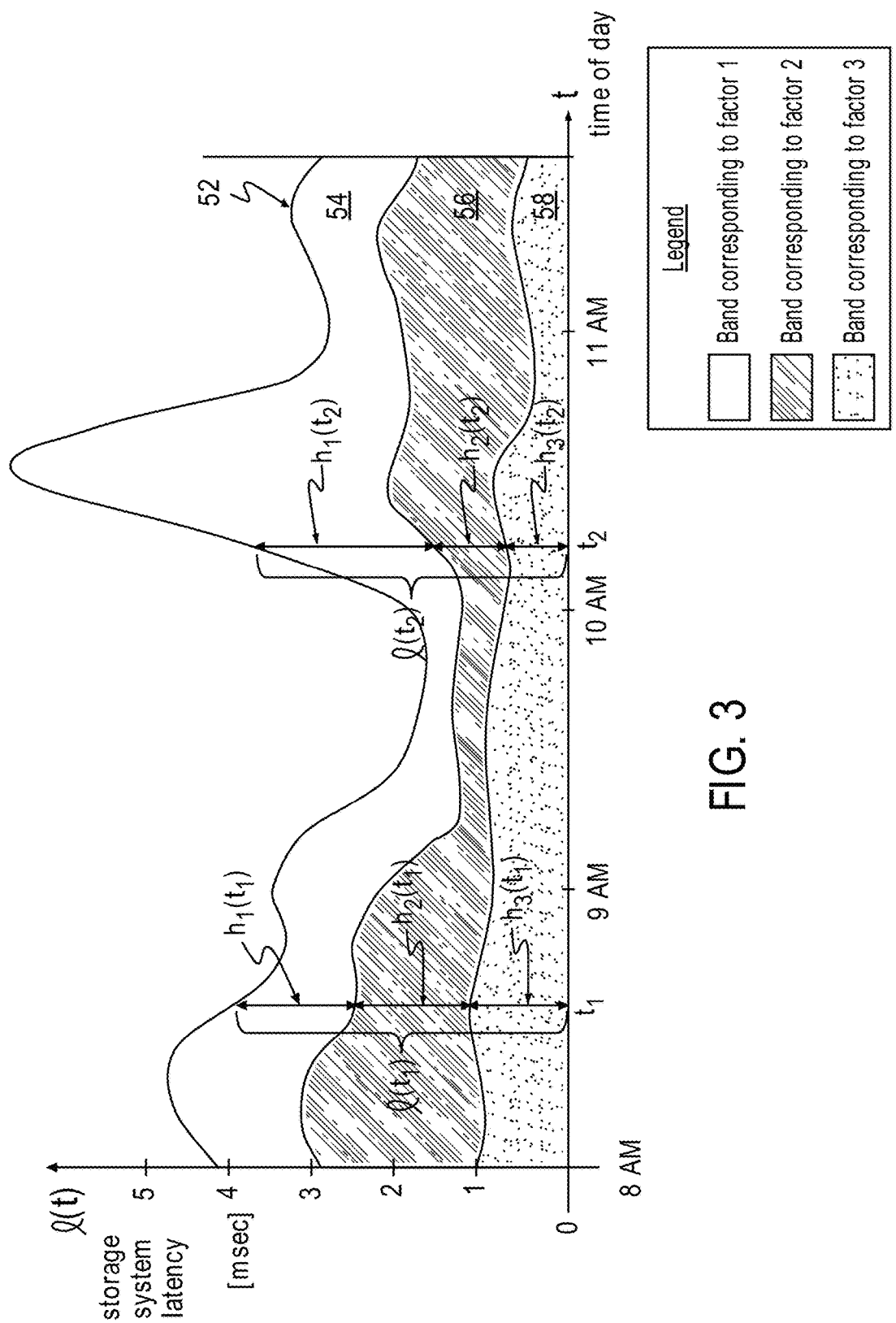
FIG. 3 depicts a simplified plot of storage system latency over time, the plot including supplemental information revealing factor(s) that are more correlated with the storage system latency than other factors, according to one embodiment of the invention.

FIG. 3 depicts a plot of the variation over time in the storage system latency (curve 52), the plot including supplemental information that enables a person to identify the factor(s) that is/are most correlated with the latency. In the embodiment of FIG. 3, the supplemental information takes the form of bands (54, 56, 58), each with a time-varying height. The bands may be arranged one on top of the other. Each band corresponds to a factor potentially contributing to the latency. In the example depicted in FIG. 3, top band 54 corresponds to factor 1; middle band 56 corresponds to factor 2; and bottom band 58 corresponds to factor 3. The height of a band at a particular time instance indicates the degree to which a corresponding factor correlates with the storage system latency around that time instance relative to other factors. At time=$t_1$, the height of band 54 has been labeled as $h_1(t_1)$; the height of band 56 has been labeled as $h_2(t_1)$; and the height of band 58 has been labeled as $h_3(t_1)$. Therefore, at time=$t_1$, it may be observed that of the three factors, factor 2 is most correlated with the storage system latency (as it has the greatest band height relative to the other bands), factor 1 has the second most correlation to the storage system latency, and factor 3 has the least correlation with the storage system latency (i.e., $h_2(t_1) > h_1(t_1) > h_3(t_1)$). Of course, this information does not imply that factor 2 is the root cause of the latency at time=$t_1$; after all, it could be the other way around that the latency around time=$t_1$ could cause the activity associated with factor 2 around time=$t_1$. Nevertheless, such analysis may suggest a person investigating the contributing factors of latency at time=$t_1$ to first investigate factor 2; if factor 2 is ruled out, to then investigate factor 1; and finally, if factor 1 is ruled out, to then investigate factor 3.

At time=$t_2$, it can be observed that the heights have changed, as $h_1(t_2) > h_2(t_2) > h_3(t_2)$. Therefore, a person investigating the contributing factors of latency at time=$t_2$ may first investigate factor 1; if factor 1 is ruled out, then investigate factor 2; and finally, if factor 2 is ruled out, then investigate factor 3.

In one embodiment, the time points of interest may correspond to spikes (or peaks) in the storage system latency, and a goal would be to find the factor(s) which significantly contribute to the spikes in order to reduce the peak latency (i.e., magnitudes of the spikes). In another embodiment, the primary interest may not be the latency at any particular time point, but rather the latency over a time segment. For instance, the latency from 9 AM to 11 AM may be studied. Accordingly, the average heights of each of the bands over a particular time segment may be computed, and the factor investigated first would be the factor corresponding to the band with the greatest average height.

Noting for clarity, the height of each band does not provide a factor's incremental contribution to the overall storage system latency, since the factors in general are not independent, and in fact are in general quite dependent. In other words, it would not be a correct observation that at time=$t_1$, factor 1 contributed 1.3 msec, factor 2 contributed 1.5 msec and factor 3 contributed 1.1 msec towards the storage system latency of 3.9 msec. The value of the top curve l(t) at a specific time does provide a measure of latency, while the absolute height of a band, in isolation, at a specific time does not provide any meaningful information. It is only the relative heights of bands (as described above) that provide meaningful information.

Figure 4:
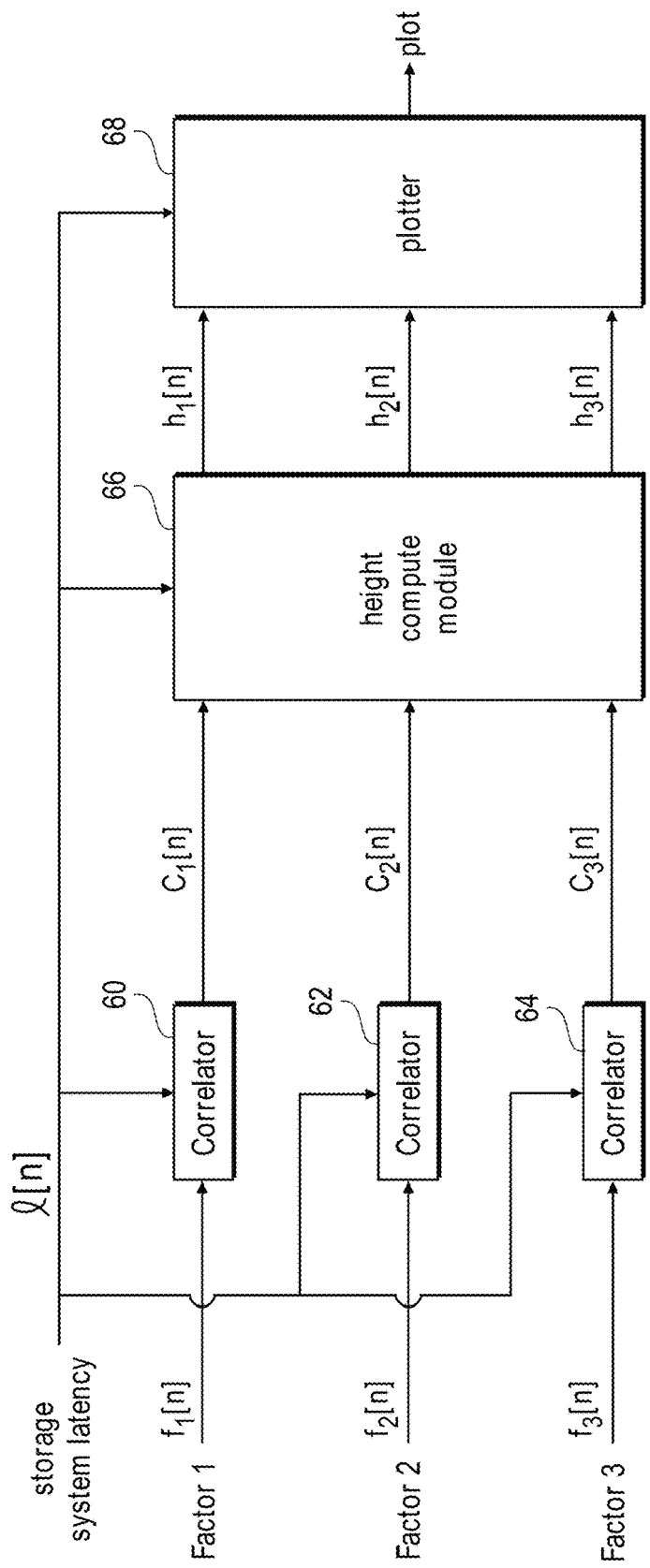
FIG. 4 depicts a signal-flow diagram of the processing that may take place in generating a plot of storage system latency versus time, according to one embodiment of the invention.

FIG. 4 depicts a signal-flow diagram that provides an overview of an exemplary process that may be used to generate the plot depicted in FIG. 3 (or similar plots). The diagram takes as input a latency time series, l[n](where "n" may denote a time index), and a plurality of factor time series: $f_1[n]$, $f_2[n]$ and $f_3[n]$. Three factor time series are present in FIG. 4, but any number of factor time series may be used in practice. The latency time series, l[n], may indicate, for each of a plurality of time instances, a length of time it took for a request to be serviced by a storage system. Each of the factor time series, $f_1[n]$, $f_2[n]$ and $f_3[n]$, may indicate, for each of the time instances, a measurement of a factor potentially contributing to latency of the storage system.

Each factor time series is correlated with the latency time series to generate a corresponding correlation time series. Specifically, the output of correlator 60 is $c_1[n]$, the output of correlator 62 is $c_2[n]$ and the output of correlator 64 is $c_3[n]$. The plurality of correlation time series, $c_1[n]$, $c_2[n]$ and $c_3[n]$, and the latency time series, l[n], are then provided to height compute module 66, which computes a height time series, $h_1[n]$, $h_2[n]$ and $h_3[n]$, for each correlation time series. Specifically, $h_1[n]$, $h_2[n]$ and $h_3[n]$ may be computed as follows:

$$h_1[n] = l[n]c_1[n]/(c_1[n]+c_2[n]+c_3[n]) \qquad \text{(Equation 1)}$$

$$h_2[n] = l[n]c_2[n]/(c_1[n]+c_2[n]+c_3[n]) \qquad \text{(Equation 2)}$$

$$h_3[n] = l[n]c_3[n]/(c_1[n]+c_2[n]+c_3[n]) \qquad \text{(Equation 2)}$$

The plurality of height time series, $h_1[n]$, $h_2[n]$ and $h_3[n]$, and the latency time series, l[n], are then provided as inputs to plotter 68 which may produce the plot as depicted in FIG. 3 (or similar plots).

Figure 5:
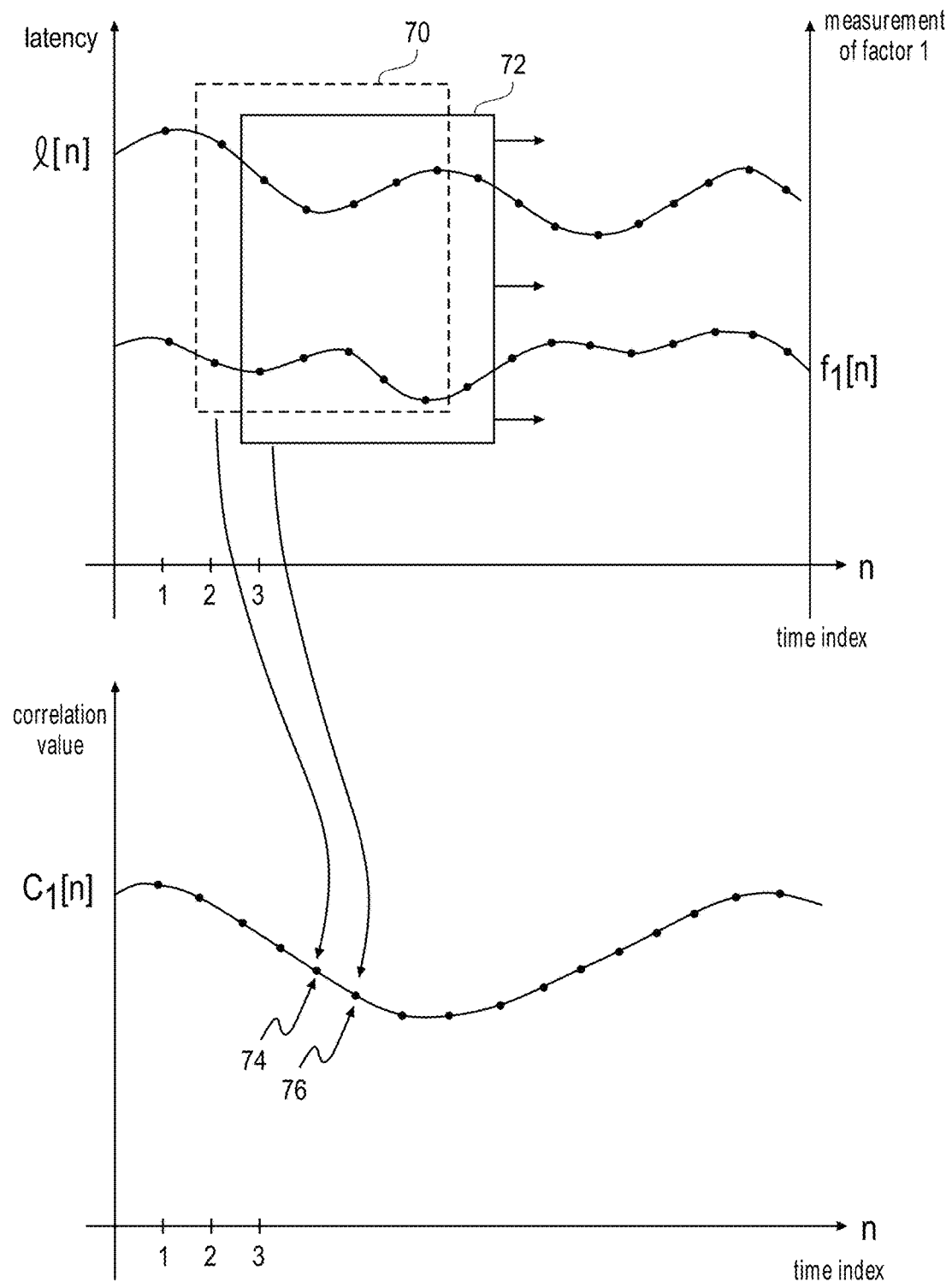
FIG. 5 depicts simplified plots which help to explain correlation computations, according to one embodiment of the invention.

To help explain the correlation process, FIG. 5 illustrates the correlation of the latency time series, l[n], with the time series of factor 1, $f_1[n]$. l[n] and $f_1[n]$ are depicted in the top plot of FIG. 5. A correlation operation is performed for a time windowed segment of each time series. In other words, a correlation operation is performed for the data contained in correlator time window 70 to arrive at correlation value 74; a correlation operation is performed for the data contained in correlator time window 72 to arrive at correlation value 76; and so on. The correlator time window may correspond to one minute of data, 10 minutes of data, etc. In the example of FIG. 5, the correlator time window includes 6 sequential samples for each of the time series. A variety of correlation operations may be utilized, including the dot product of two segments (i.e., each segment forming a vector), the $r^2$ (or r-squared) correlation of two segments, and other well-known measures of correlation. The resulting value of the correlation operation represents the degree to which two time windowed segments of data correlate with one another. A sequence of correlation values generated by the above-described correlator operation forms a correlation time series.

It is noted that a correlation value is associated with a specific time index. In the present case, the time index of the correlation value has been chosen to match the middle of the correlation time window (i.e., time index of correlation value 74 matches the middle of correlator time window 70; time index of correlation value 76 matches the middle of correlator time window 72). In another embodiment, it is also possible that the time index be chosen to match the beginning or end of the correlator time window.

Figure 6:
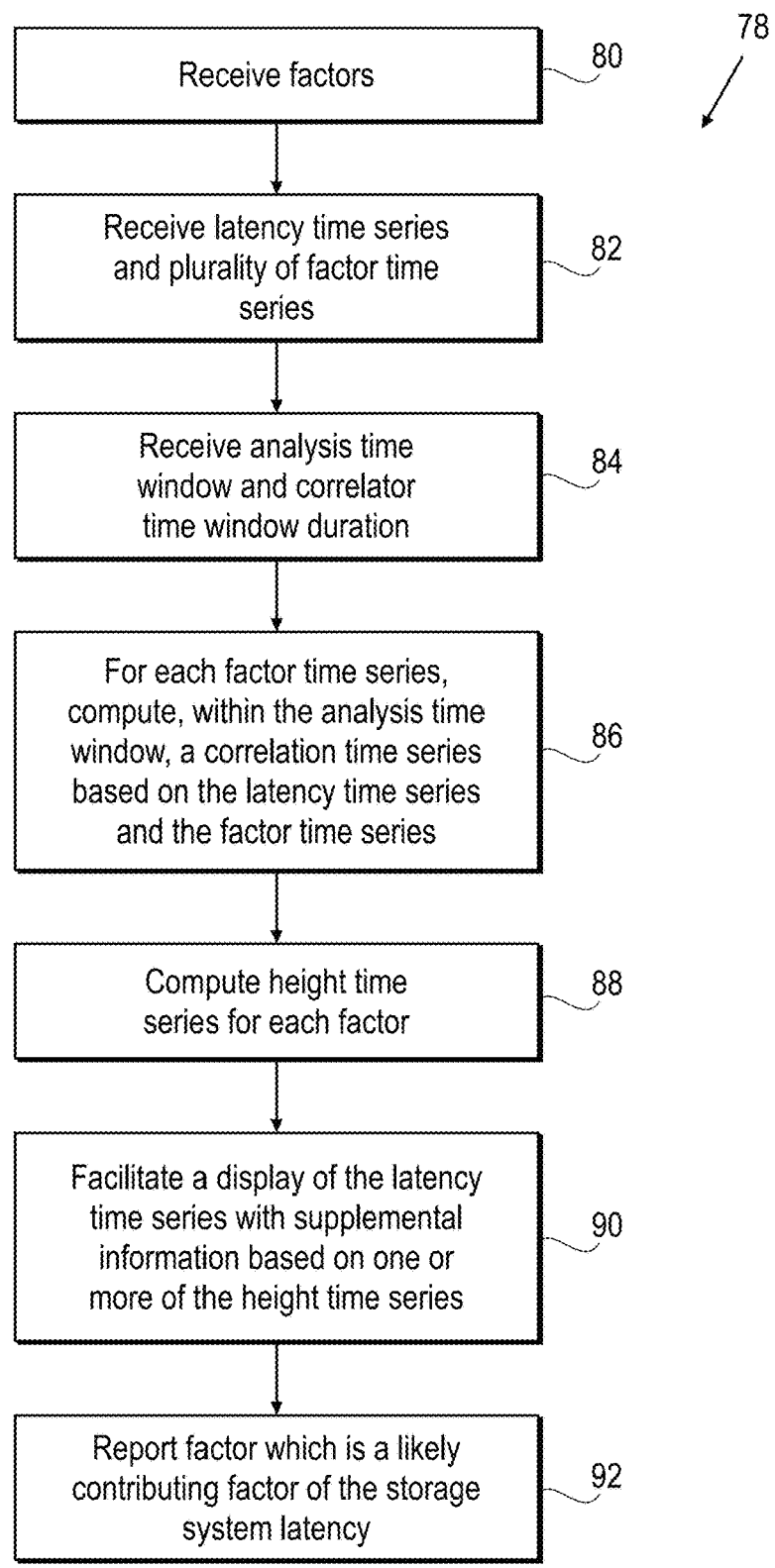
FIG. 6 depicts a flow diagram of a process to facilitate a determination of the major contributing factor(s) of storage system latency, according to one embodiment of the invention.

FIG. 6 depicts flow diagram 78 of a method that may be performed by analysis server 32, according to one embodiment of the invention. At step 80, the analysis server may receive a collection of factors that potentially contribute to the latency of the storage system. In one embodiment, the potential factors may be received from a human operator of the analysis server. Alternatively or in addition, the collection of factors may be based on factors that were identified as important contributors in a prior analysis of storage system latency. At step 82, the analysis server may receive a latency time series, and a factor time series corresponding to each of the received factors. At step 84, the analysis server may receive a time window for which to analyze the data, termed the analysis time window for conciseness. At step 84, the analysis server may also receive a time duration for the correlator time window, termed the correlator time window duration for conciseness. In the context of FIG. 3, the analysis time window was chosen as 8 AM to 11:30 AM. In the context of FIG. 5, the correlator time window duration was chosen as 6 samples.

At step 86, the analysis server may compute, for each factor time series, a correlation time series within the analysis time window based on the latency time series and the factor time series. Each correlation time series may be computed in accordance with the techniques discussed above in reference to FIG. 5. The duration of the correlator time window for one or more of the correlators may be set as the correlator time window duration received in step 84 above. At step 88, the analysis server may compute a height time series for each factor based on the plurality of correlation time series and the latency time series. At step 90, the analysis server may display the latency time series with supplemental information based on one or more of the height time series (and/or based on one or more of the correlation time series), the supplemental information revealing, for a plurality of time instances within the analysis time window, which one of the factors is most correlated with the latency time series proximate to the time instance.

At step 92, the analysis server may report to a human operator or client device 36 a factor which is a likely contributing factor (or most likely contributing factor) to the storage system latency. Such factor may correspond to the factor with the greatest average height time series (e.g., averaged over the analysis time window or other user-specified time window). While not depicted in the flow chart of FIG. 6, steps 80-92 may be repeated for latency measurement and sensor measurements from different dates or different storage systems.

Figure 7:
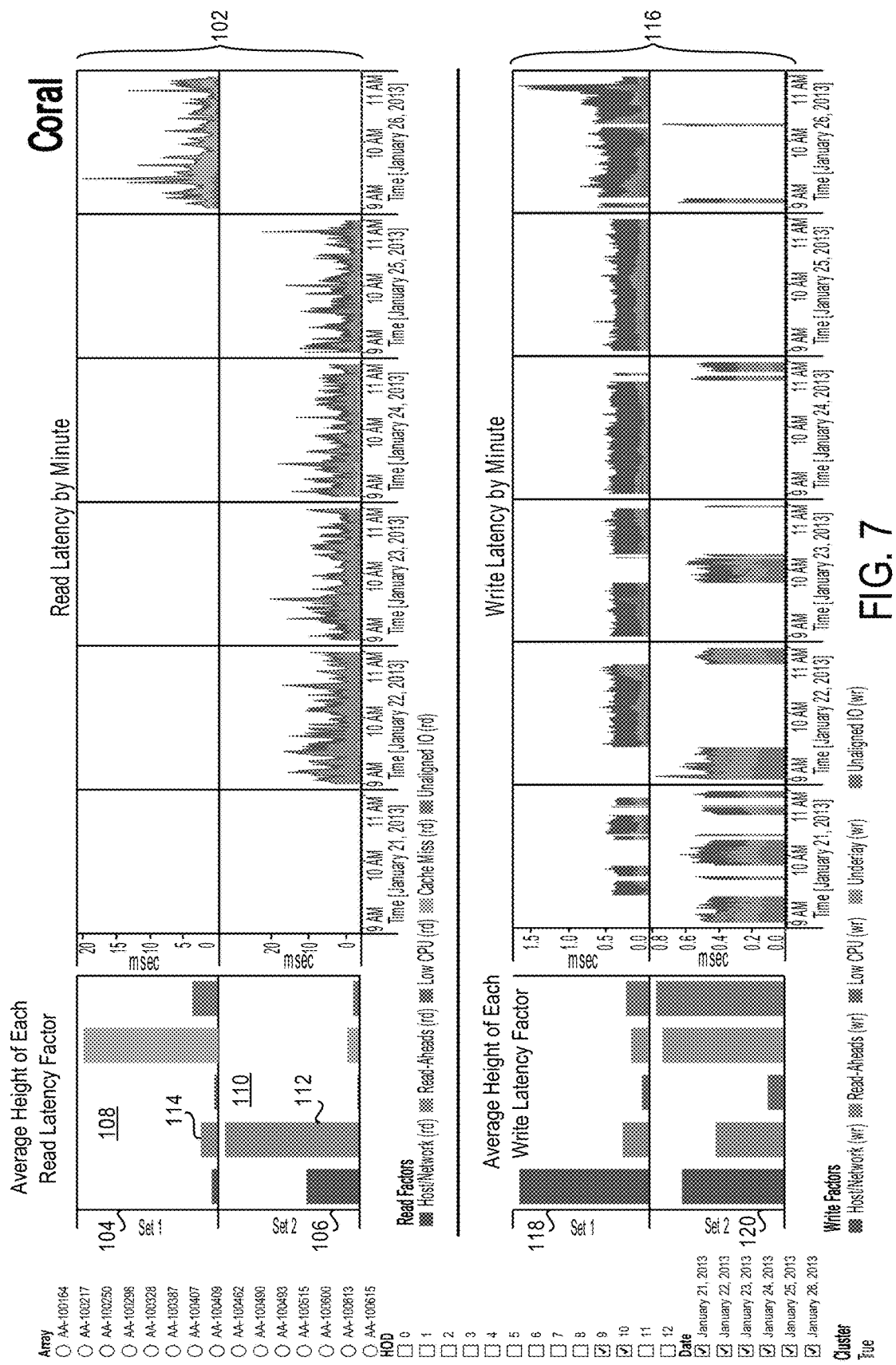
FIG. 7 depicts actual plots of storage system latency over time, with supplemental information revealing factor(s) that are more correlated with the storage system latency than other factors, according to one embodiment of the invention.

FIG. 7 depicts latency plots for an actual storage system deployed in the field. The top plots of FIG. 7 (labeled 102) display the read latency by minute (i.e., read latency measurements taken every minute). The analysis time window is from 9 AM to 11 AM. The factors considered for the read latency, in this particular example, are a host/network process, a read-ahead process, a low CPU process, a cache miss process and an unaligned IO process. The host/network process, in this particular example, refers to processes associated with application server 38 and network 40, as depicted in FIG. 2 above. The read-ahead process, in this particular example, refers to a process on storage array 42 that anticipates soon to be requested data, in which the anticipated data is read into cache from disk. A low CPU process, in this particular example, refers to a process on storage array 42 in which the CPU of the storage array is fully subscribed with other work, and so is unable to service data requests in a timely manner. A cache miss process, in this particular example, refers to a process on storage array 42 in which data is requested from a cache, and upon determining that the requested data is not available in the cache, requesting the data from disk or other storage. An unaligned IO process, in this particular example, refers to a process where application server 38 sends IO requests to storage array 42, where the IO requests refer to logical block address regions not aligned with block boundaries defined internally to the storage array.

Latency measurements are displayed for a series of days from Jan. 21, 2013 to Jan. 26, 2013. For the first five days (from January 21 to January 25), the read-ahead process (over the span of the analysis time window) is most correlated with the storage system latency. For ease of discussion, the read-ahead process may be referred to as the "dominant factor" for the first five days. On the last day (January 26), the cache miss process (over the span of the analysis time window) is most correlated with the storage system latency (i.e., is the dominant factor for the last day). In one embodiment of the invention, plots (or segment of plots) with the same dominant factor (also known as the same domain of performance) may be clustered or grouped together. In FIG. 7, the first five plots with the read-ahead process as the dominant factor are grouped together in row 106, whereas the last plot with the cache miss as the dominant factor has been displayed separately in row 104. The average heights of the factors (i.e., averaged over all data from each row) is also shown at the beginning of each row in bar charts 108 and 110. This average may be performed in such a way that, for a certain factor, that factor's heights over time, as depicted in each row, count equally toward the average height of that factor. It may also be performed in such a way that, for a certain factor, that factor's heights over time, as depicted in each row, count toward the average height of that factor according to how many IO requests were made at the time corresponding to the factor height.

It is noted that the change in the storage system's latency behavior between Jan. 25, 2013 and Jan. 26, 2013 was actually the result of a software patch to the read-ahead process. Having identified the read-ahead process as a potential bottleneck contributing to the storage system latency, a software patch was created to improve the read-ahead process. Upon the introduction of the software patch, the sensor data revealed that the read-ahead process was no longer the factor most correlated with the latency. Specifically, bar 112 for the read-ahead process was the tallest in bar chart 110 (corresponding to data prior to the patch), while bar 114 for the read-ahead process is no longer the tallest in bar chart 108 (corresponding to data after the patch). In other words, the latency plots, as amplified by the clustered presentation, is able to provide evidence corroborating the success (or failure) of a software patch or hardware upgrade.

The bottom plots of FIG. 7 (labeled 116) display the write latency by minute. The analysis time window is from 9 AM to 11 AM. The factors considered for the write latency are a host/network process, a read-ahead process, a low CPU process, an underlay process and an unaligned IO process. The host/network process, in this particular example, refers to processes associated with application server 38 and network 40, as depicted in FIG. 2 above. The read-ahead process, in this particular example, refers to a process on storage array 42 that anticipates soon to be requested data, in which the anticipated data is read into cache from disk. A low CPU process, in this particular example, refers to a process on storage array 42 in which the CPU of the storage array is fully subscribed with other work, and so is unable to service data requests in a timely manner. An unaligned IO process, in this particular example, refers to a process where application server 38 sends IO requests to storage array 42, where the IO requests refer to logical block address regions not aligned with block boundaries defined internally to the storage array. An underlay process, in this particular example, implies an unaligned IO process. In the case of an underlay process, it is further required that write requests specifically be unaligned, implying that some portions of some blocks must be retrieved from disk or cache on storage array 42 so that whole blocks can be returned to disk and/or cache.

Latency and factor measurements are displayed for a series of days from Jan. 21, 2013 to Jan. 26, 2013. In the write latency plots, segments of plots (i.e., generated by dividing a single plot into multiple plots having disjoint time segments) with the same dominant factor were clustered (or grouped) together. Row 118 depicts segments of plots with the host/network process as the dominant factor, whereas row 120 depicts segments of plots with the unaligned IO as the dominant factor. Therefore, the clustering operation may be performed at any level of granularity, by days, as in rows 104 and 106, or at a finer granularity, as in rows 118 and 120.

Figure 8:
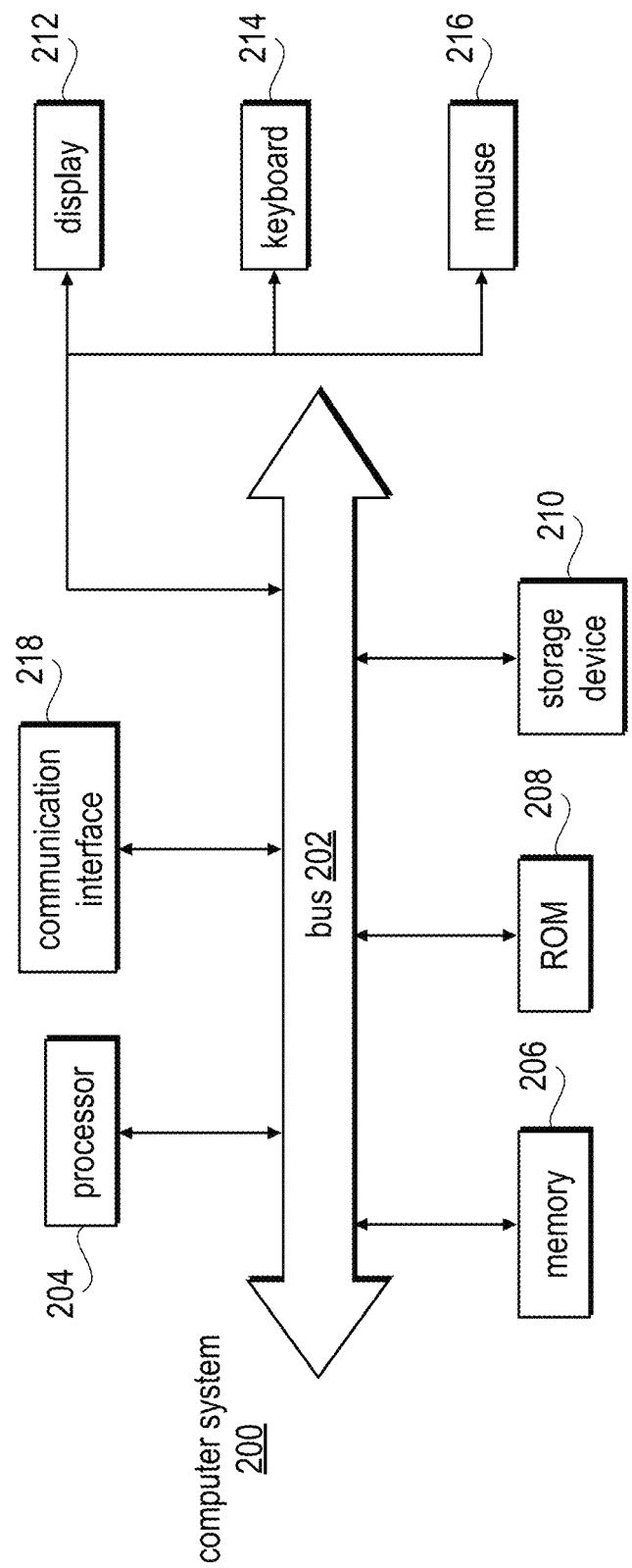
FIG. 8 depicts a system diagram of a computing device.

As is apparent from the foregoing discussion, aspects of the present invention involve the use of various computer systems and computer readable storage media having computer-readable instructions stored thereon. FIG. 8 provides an example of a computer system 200 that is representative of any of the client devices, application servers, storage arrays, monitoring servers, and analysis servers discussed herein. Note, not all of the various computer systems may have all of the features of computer system 200. For example, certain of the computer systems discussed above may not include a display inasmuch as the display function may be provided by a client computer communicatively coupled to the computer system or a display function may be unnecessary. Such details are not critical to the present invention.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, is coupled to the bus 202 for communicating information and command selections to the processor 204. Another type of user input device is cursor control device 216, such as a mouse, a trackball, or cursor direction keys for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units (e.g., field programmable gate arrays) may be used in place of or in combination with processor 204 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 provides a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet.

Thus, methods, systems and computer-readable media for analyzing storage system latency by correlating the activity of storage system components with latency measurements have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for determining and deploying an upgrade to a storage system, comprising:
   determining, by an analysis server communicatively coupled to the storage system, a plurality of candidate factors that contribute to latency of the storage system;
   receiving, by the analysis server, a latency time series from the storage system, wherein
   the latency time series includes latency measurements measured by sensors at the storage system at different times over a particular time period;
   determining, by the analysis server, a correlation time series for each of the candidate factors by correlating the latency time series of the storage system with each of the candidate factors;
   generating, by the analysis server, a graph of the latency of the storage system over the particular time period by placing latency bands of the candidate factors corresponding to the correlation time series for the candidate factors on top of each other along a latency axis in the graph such that a height of the graph at each time instance in the particular time period is a sum of latencies contributed by each of the candidate factors;
   determining, by the analysis server, an average height of each of the latency bands of the candidate factors over a time segment in the graph;
   selecting, by the analysis server, one of the candidate factors that has a largest average height as a factor contributing most to the latency of the storage system;
   and deploying an upgrade to the storage system to reduce the latency caused by the selected candidate factor, wherein the upgrade is one or more of a hardware upgrade and a software patch.

2. The method of claim 1, further comprising, subsequent to deploying the upgrade, determining whether the selected candidate factor is less correlated with the storage system latency, as compared to the selected candidate factor's correlation with the storage system latency prior to the upgrade.

3. The method of claim 1, wherein one of the candidate factors that contributes to the latency of the storage system is a number of cache misses that occurred at the storage system.

4. The method of claim 1, further comprising reporting, by the analysis server, the selected candidate factor to a client device.

5. The method of claim 1, further comprising determining, by the analysis server, whether a first one of the candidate factors or a second one of the candidate factors is more correlated with the storage system latency.

6. The method of claim 5, further comprising reporting, by the analysis server, the first candidate factor to a client device if the first candidate factor is more correlated with the storage system latency; otherwise, reporting, by the analysis server, the second candidate factor to the client device if the second candidate factor is more correlated with the storage system latency.

7. The method of claim 1, further comprising determining a peak in the latency time series, and determining a candidate factor that contributes to the peak in the latency time series.

8. The method of claim 1, wherein the latency time series comprises, for each of a plurality of read requests, a measurement of a length of time taken by the storage system to process the read request.

9. The method of claim 1, wherein the latency time series comprises, for each of a plurality of write requests, a measurement of a length of time taken by the storage system to process the write request.

10. An analysis server for processing measurements taken by one or more sensors instrumented on a storage system, the analysis server comprising:
    a processor;
    a memory communicatively coupled to the processor; and
    a set of instructions on the memory that, when executed by the processor, cause the processor to:
    determine a plurality of candidate factors that contribute to latency of the storage system;
    receive a latency time series from the storage system, wherein the latency time series includes latency measurements measured by the one or more sensors at different times over a particular time period;
    determine a correlation time series for each of the candidate factors by correlating the latency time series associated with the storage system with each of the candidate factors;
    generate a graph of the latency of the storage system over the particular time period by placing latency bands of the candidate factors corresponding to the correlation time series for the candidate factors on top of each other along a latency axis in the graph such that a height of the graph at each time instance in the particular time period is a sum of latencies contributed by each of the candidate factors;
    determine an average height of each of the latency bands of the candidate factors
    over a time segment in the graph;
    and select one of candidate factors that has a largest average height as a factor contributing most to the latency of the storage system, wherein based on the selected candidate factor, an upgrade is deployed to the storage system, wherein the upgrade is one or more of a hardware upgrade and a software patch.

11. The analysis server of claim 10, wherein the set of instructions is to cause the processor to, subsequent to the upgrade, determine whether the selected candidate factor is less correlated with the storage system latency, as compared to the selected candidate factor's correlation with the storage system latency prior to the upgrade.

12. The analysis server of claim 10, wherein the set of instructions is to cause the processor to determine whether a first one of the candidate factors or a second one of the candidate factors is more correlated with the storage system latency.

13. The analysis server of claim 12, wherein the set of instructions is to cause the processor to report the first candidate factor to a client device if the first candidate factor is more correlated with the storage system latency; otherwise, report the second candidate factor to the client device if the second candidate factor is more correlated with the storage system latency.

14. The analysis server of claim 10, wherein one of the candidate factors that contributes to the latency of the storage system is a number of cache misses that occurred at the storage system.

15. A non-transitory machine-readable storage medium comprising software instructions that, when executed by a processor of an analysis server, cause the processor to:

determine candidate factors that contribute to latency of a storage system;

receive a latency time series from the storage system, wherein the latency time series includes latency measurements measured by one or more sensors at different times over a particular time period;

determine a correlation time series for each of the candidate factors by correlating the latency time series associated with the storage system with each of the candidate factors;

generate a graph of the latency of the storage system over the particular time period by placing latency bands of the candidate factors corresponding to the correlation time series for the candidate factors on top of each other along a latency axis in the graph such that a height of the graph at each time instance in the particular time period is a sum of latencies contributed by each of the candidate factors;

determine an average height of each of the latency bands of the candidate factors over a time segment in the graph;

select one of the plurality of candidate factors that has a largest average height as a factor contributing most to the latency of the storage system, wherein based on the selected candidate factor, an upgrade is deployed to the storage system, wherein the upgrade is one or more of a hardware upgrade and a software patch.

16. The non-transitory machine-readable storage medium of claim 15, further comprising software instructions that, when executed by the processor, cause the processor to, subsequent to the upgrade, determine whether the selected candidate factor is less correlated with the storage system latency, as compared to the selected candidate factor's correlation with the storage system latency prior to the upgrade.

17. The non-transitory machine-readable storage medium of claim 15, further comprising software instructions that, when executed by the processor, cause the processor to determine whether a first one of the candidate factors or a second one of the candidate factors is more correlated with the storage system latency.

18. The non-transitory machine-readable storage medium of claim 17, further comprising software instructions that, when executed by the processor, cause the processor to report the first candidate factor to a client device if the first candidate factor is more correlated with the storage system latency;

otherwise, report the second candidate factor to the client device if the second candidate factor is more correlated with the storage system latency.

19. The non-transitory machine-readable storage medium of claim 15, wherein one of the candidate factors that contributes to the latency of the storage system is a number of cache misses that occurred at the storage system.

* * * * *